United States Patent
McGlothlan et al.

(10) Patent No.: US 7,980,447 B2
(45) Date of Patent: Jul. 19, 2011

(54) JET STACK BRAZING IN A DIFFUSION FURNACE

(75) Inventors: J. Kirk McGlothlan, Beaverton, OR (US); Christopher Lansing Renfro, Hillsboro, OR (US); Constance Hilliary Texley Jones, Newberg, OR (US)

(73) Assignee: Xerox Corporation, Norwalk, CT (US)

( * ) Notice: Subject to any disclaimer, the term of this patent is extended or adjusted under 35 U.S.C. 154(b) by 103 days.

(21) Appl. No.: 12/334,381

(22) Filed: Dec. 12, 2008

(65) Prior Publication Data

US 2010/0147924 A1   Jun. 17, 2010

(51) Int. Cl.
   *B23K 31/12* (2006.01)
(52) U.S. Cl. .................. 228/104; 206/832; 438/758
(58) Field of Classification Search ............ 228/104, 228/57, 193, 178; 156/345.1; 118/729, 99, 118/719; 427/255.5, 251, 248.1; 438/758, 438/455; 29/890.1
See application file for complete search history.

(56) References Cited

U.S. PATENT DOCUMENTS

| | | | |
|---|---|---|---|
| 3,496,630 A | 2/1970 | Duff et al. | |
| 3,789,498 A | 2/1974 | Cole | |
| 3,933,480 A | 1/1976 | Tipnis | |
| 4,429,824 A | 2/1984 | Woodward | |
| 4,453,033 A | 6/1984 | Duff et al. | |
| 4,699,805 A * | 10/1987 | Seelbach et al. | 438/680 |
| 4,883,219 A | 11/1989 | Anderson et al. | |
| 5,329,095 A * | 7/1994 | Okase | 219/390 |
| 5,372,649 A * | 12/1994 | Gwin | 118/728 |
| 5,406,318 A | 4/1995 | Moore et al. | |
| 6,001,182 A * | 12/1999 | Page et al. | 118/715 |
| 6,054,684 A * | 4/2000 | Pas et al. | 219/390 |
| 6,107,212 A * | 8/2000 | Fujita | 438/758 |
| 6,444,940 B1 * | 9/2002 | Saito et al. | 219/390 |
| 6,482,753 B1 * | 11/2002 | Tometsuka | 438/758 |
| 6,799,712 B1 | 10/2004 | Austen et al. | |
| 6,829,824 B2 | 12/2004 | Reschnar | |
| 7,540,084 B2 | 6/2009 | Kobayashi | |
| 2003/0221853 A1 | 12/2003 | Shiozawa | |
| 2004/0079785 A1 | 4/2004 | Yang | |
| 2006/0065701 A1 | 3/2006 | Kobayashi | |
| 2006/0088077 A1 | 4/2006 | Jussel et al. | |
| 2006/0180638 A1 | 8/2006 | Hirota | |
| 2007/0195130 A1 | 8/2007 | Koda et al. | |

FOREIGN PATENT DOCUMENTS

| | | |
|---|---|---|
| EP | 0357020 A2 | 3/1990 |
| EP | 0326568 B1 | 8/1990 |
| EP | 1 029 625 A2 | 8/2000 |
| JP | 63025928 A | 2/1988 |
| WO | 8304240 A1 | 12/1983 |

* cited by examiner

*Primary Examiner* — Roy King
*Assistant Examiner* — Michael Aboagye

(57) ABSTRACT

A method and apparatus for batch brazing jet stacks in a diffusion furnace. The method may include inserting fusible parts into slots of quartz boats and transporting the quartz boats into an interior of a reaction chamber of a diffusion furnace. An operator may seal the interior of the reaction chamber and an atmosphere of the interior of the reaction chamber may be adjusted according to a brazing recipe. A preheated furnace heating element may be moved toward the reaction chamber to increase a temperature and the fusible parts may be brazed according to the brazing recipe. The furnace heating element may then be moved away from the reaction chamber, the chamber unsealed, and the brazed parts removed.

15 Claims, 10 Drawing Sheets

JET STACK BRAZING IN A DIFFUSION FURNACE

RELATED APPLICATION DATA

This application is related to application Ser. No. 12/325,973, now abandoned titled "Unified Metal Alloying in a Diffusion Furnace," filed on Dec. 1, 2008.

BACKGROUND

Conventionally, jet stack manufacturers use humpback continuous belt driven furnaces to braze jet stacks. The brazing process involves alloying together about 16 to 22 plates that have previously been bonded together using a high pressure bond press. The brazing process combines the 16 to 22 bonded plates into a single, fused-together, hermetically sealed plate. The fused-together plate yields a brazed jet stack for use in a printer. The brazed jet stack includes aligned channels within the fused plate for squirting ink out.

The humpback furnace is bulky and expensive. In addition, the continuous belt driven nature of the humpback furnace causes a dirty environment and can lead to metal contamination. Other challenges include lack of process control interfaces or visibility of process control parameters, which impose high maintenance burdens on operators, engineers, or other skilled technicians whose job duties often include the smooth operation of the equipment. The lack of a process control interface makes the humpback furnace difficult to monitor while in production. These, and other problems associated with the humpback furnace, can lead to decreased yields and increased costs. Further, the humpback furnace creates safety concerns and has earned the nick name "fire breathing dragon" due to occurrences of flames shooting into the clean room, which can potentially injure operators who may be standing nearby. The humpback furnace also makes inefficient use of hydrogen gas, thereby driving operational costs up even more.

Figure 1:
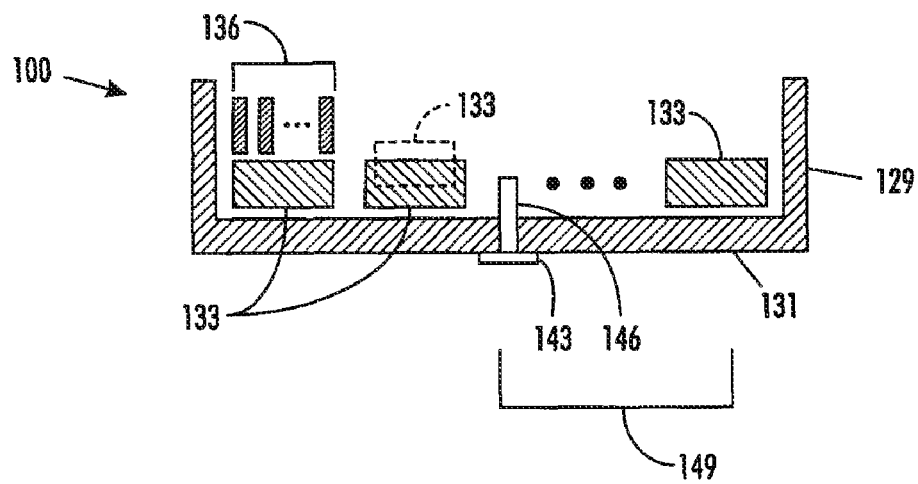
FIG. 1 shows an example of a side view of a cradle, including a center support to prevent bowing of the cradle, and quartz boats positioned on the cradle and supporting fusible parts, according to some embodiments of the present invention.

The foregoing and other features, objects, and advantages of the invention will become more readily apparent from the following detailed description, which proceeds with reference to the accompanying drawings.

DETAILED DESCRIPTION OF THE EMBODIMENTS

Generally, a process of fusing plates together into hermetically sealed jet stacks includes discreet steps performed by two separate large pieces of equipment. First, after arranging about 16-22 gold plated stainless steel plates in proximity of each other, a bond press applies high pressure to the plates under a nitrogen and hydrogen atmosphere to get the plates to stick together so that they are aligned in preparation of the next step, i.e., that of brazing. The brazing step includes alloying the 16-22 plates into a single combined jet stack. While historically, the humpback continuous belt driven furnace performed the brazing of the jet stacks, embodiments of the present invention describe a batch brazing process using a diffusion furnace to construct the hermetically sealed jet stacks.

More specifically, a diffusion furnace with a movable furnace heating element can be used in a batch brazing process with fast thermal ramps and the capability of high throughput with little or no particle generation. Before jet stacks can be batch brazed in a diffusion furnace, an engineer or other qualified technician may develop and fine-tune a brazing recipe. Together with the movable furnace heating element, the brazing recipe can adjust thermal profiles to provide a fast ramp up and down of the temperature of a reaction chamber of the diffusion furnace, with a controlled time above a desired brazing temperature.

The brazing recipe comprises a sequence of recipe segments. Each of the recipe segments may include actions. For example, actions may include increasing or decreasing a temperature of a reaction chamber of the diffusion furnace, purging a particular type of gas from the reaction chamber using a mass flow controller, filling the reaction chamber with a different gas using a mass flow controller, checking for moisture within the reaction chamber, and so forth. Each action may be associated with an alarm and a title to give notice to an operator of any aborted action due to an error or fault within the recipe segment. The alarm and the title can inform the operator of the problem, such as where the action was aborted, so that the operator can call a shift supervisor or other maintenance personnel in order to correct the problem.

In addition to determining the content and order of segment and actions, and how the alarms and titles are configured in the brazing recipe, building the brazing recipe includes generating beginning or ending points for the recipe segments themselves, as well as the actions within each segment. The beginning or ending points may be conditional on the completion of a previous action based on feedback information from sensors located in or around the diffusion furnace. Alternatively, the content and order of segments or actions may be fixed according to predefined parameters. Because the fusing of gold plated stainless steel plates requires precise atmospheric conditions within the reaction chamber of the diffusion furnace and carefully controlled temperatures, the beginning or ending points of each recipe segment or each action within the recipe segment can be important to achieve high quality jet stacks having even gold flow around apertures of the jet stacks. To fine-tune the brazing recipe, the engineer or other qualified technician may use temperature sensors located on both the jet stacks themselves and on a cantilever or paddle upon which the jet stacks are supported, as will be explained in more detail below.

After the engineer or qualified technician completes the fine-tuning of the brazing recipe, the diffusion furnace may perform production level batch brazing operations. The batch brazing operations may include various operations designed to yield production level quantities of jet stacks having even gold flow around apertures of the jet stacks. For example, performing the batch brazing operations may include inserting the gold plated stainless steel plates into slots of quartz boats. The slots of the quartz boats may have predefined widths that are designed to yield flat jet stacks, as further explained in detail below. After the operator inserts the jet stacks into the slots of the quartz boats, the operator may place the quartz boats, including the jet stacks, into a cradle, which may then be placed on a cantilever or paddle to be inserted into an interior of a reaction chamber of the diffusion furnace. The operator may then seal the reaction chamber by enclosing the reaction chamber with an end cap.

Thereafter, the diffusion furnace may adjust an atmosphere of the interior of the reaction chamber according to the brazing recipe. The brazing recipe may also direct the diffusion furnace to move a preheated furnace heating element from a location spaced apart from the reaction chamber to a location in substantial proximity with the reaction chamber to increase a temperature of the atmosphere of the interior of the reaction chamber above a predefined brazing temperature for a predefined brazing time period. The predefined brazing temperature may be about 1100 degrees Celsius and the predefined brazing time may be about four minutes.

The diffusion furnace may then braze the jet stacks. Once the brazing process has completed, the diffusion furnace may move the furnace heating element from the location in substantial proximity with the reaction chamber to the location spaced apart from the reaction chamber to decrease the temperature of the atmosphere of the interior of the reaction chamber until the atmosphere cools to about room temperature. The operator may unseal the interior of the reaction chamber by removing the end cap, whereupon the operator may remove the cradle, thereby yielding brazed jet stacks.

These and other inventive aspects of the present invention will become more readily apparent from the following detailed description of the drawings.

FIG. 1 shows a side view of an example cradle 100, including a center support 149 to prevent bowing of the cradle 100, quartz boats 133 located on the cradle 100, and fusible parts 136 located on the quartz boats, according to some embodiments of the present invention. The fusible parts 136 may be gold plated stainless steel plates, which have previously been subjected to a bond press under high temperature to get the plates to stick together in an aligned position. Alternatively, the fusible parts 136 may be components of other types of devices such as hard disk drives, circuit boards, or any other type of components that may need to be fused together in a tightly controlled environment. For purposes used herein, the fusible parts 136 will be referred to interchangeably with the term "jet stacks," while the reader should keep in mind that other possibilities exist.

The cradle 100 may be comprised of quartz or some other suitable material that can be subjected to rapid temperature fluctuations without cracking or dispersing impurities into a reaction chamber of a diffusion furnace (not shown in FIG. 1). The cradle 100 may include horizontal portions 131 for supporting the quartz boats 133 and vertical portions 129 to facilitate the transportation of the quartz boats.

An operator, engineer, or other qualified technician trained to use the diffusion furnace may lift the quartz boats 133 off of the cradle 100 and take the quartz boats 133 to other locations of a clean room to fill the quartz boats with the fusible parts 136. The operators may then return and arrange the quartz boats 133 including the fusible parts on the cradle 100.

The cradle 100 may include a center support 149 having a stabilizing element 146 and base support elements 143, as further described with reference to FIGS. 3-4, or may include other supports 149, as further described with reference to FIG. 5. In addition, the quartz boats 133 may include slots that have predefined widths corresponding to a width of a jet stack and a marginal width relative to the width of the jet stack, to yield flat jet stacks, as further described with reference to FIG. 2.

Figure 2:
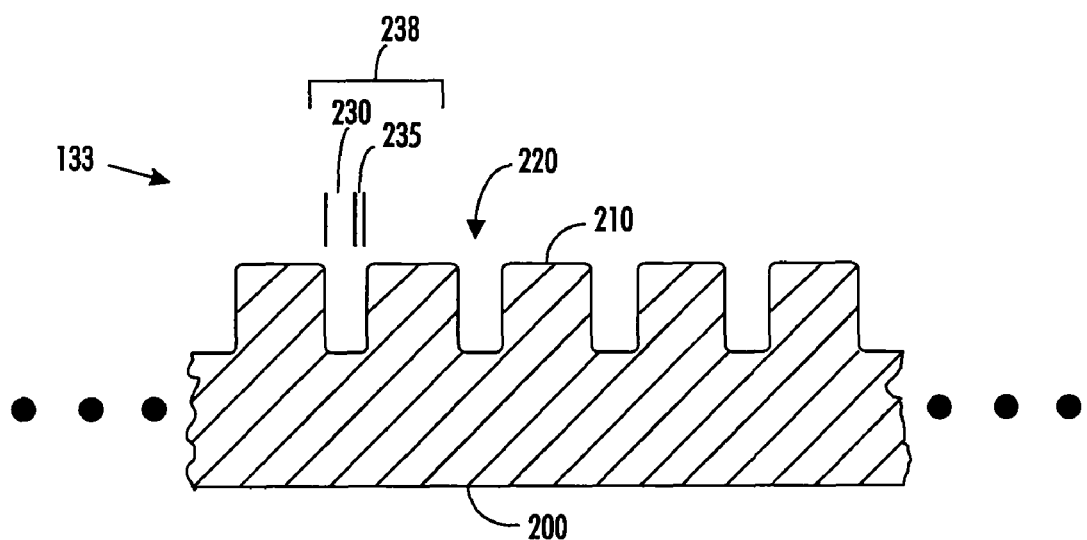
FIG. 2 shows a portion of the quartz boat illustrated in FIG. 1, according to some embodiments of the present invention.

FIG. 2 shows a portion 200 of the quartz boat 133 illustrated in FIG. 1, according to some embodiments of the present invention. The quartz boat 133 may include slots 220 separated by teeth 210. Jet stacks 230 may be inserted into the slots 220. In some embodiments, there may be multiple slots associated with one jet stack. Each slot 220 may have a predefined width 238 corresponding to a width of a jet stack 230 and a marginal width 235. If the predefined width 238 is too narrow, then the fusible parts 136 (hereinafter referred to as jet stacks 136) cannot easily be inserted into and removed from the slots 220.

On the other hand, if the predefined width 238 is too wide, then a flatness of the jet stacks 136 degrades. For example, if the marginal width 235 is about 0.015 inches, then the flatness of the jet stacks 136 after brazing is about 0 inches. In other words, there is very little if any warping of the jet stacks, yet the jet stacks can slide in and out of the slots without damage. However, if the marginal width 235 is 0.025 inches, for example, the flatness of the jet stacks 136 after brazing is between about 0.005 and 0.02 inches, indicating warping of the jet stacks. Similarly, if the marginal width is about 0.03 inches, the flatness of the jet stacks 136 after brazing is as high as 0.01 inches, which also indicates warping. If the marginal width 235 is 0.02 inches, then the flatness of the jet stacks 136 after brazing is similar to the flatness when the marginal width 235 is 0.015 inches, i.e., about zero. To ensure a safety margin, the preferred marginal width 235 is therefore about 0.015 inches.

Figure 3:
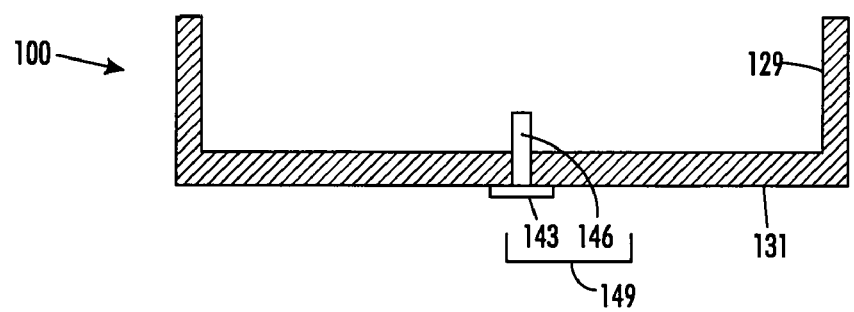
FIG. 3 shows one example of a side view of the cradle of FIG. 1 without the quartz boats and the fusible parts, including a center support to prevent bowing of the cradle, according to one embodiment of the present invention.
Figure 4:
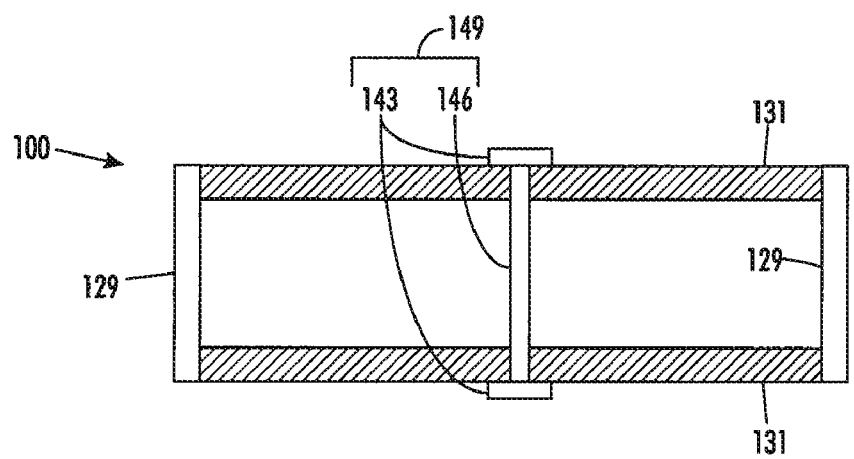
FIG. 4 shows a plan view of the cradle of FIG. 3, including the center support to prevent bowing of the cradle.

FIG. 3 shows one example of a side view of the cradle 100 of FIG. 1 without the quartz boats and the fusible parts, including a center support 149 to prevent bowing of the cradle 100, according to one embodiment of the present invention. FIG. 4 shows a plan view of the cradle 100 of FIG. 3, including the center support 149 to prevent bowing of the cradle 100. The description will proceed with reference to both of FIGS. 3 and 4.

When multiple quartz boats are placed on the cradle 131, particularly when the quartz boats are loaded with jet stacks, the cradle 131 can sag. The sagging can cause the cradle to catch and break when transferring jet stacks, which can also cause the jet stacks to become damaged or contaminated. Such problems can result in reject jet stacks and equipment downtime.

The center support 149 provides stabilization of the cradle 100 using stabilizing element 146 spanning horizontal portions 131. The base support elements 143 may affix the stabilizing element 146 to the horizontal portions 131. The center support 149 creates an even weight distribution and prevents bowing or sagging. The stabilizing element 146 and the base support elements 143 may comprise quartz or other materials.

Figure 5:
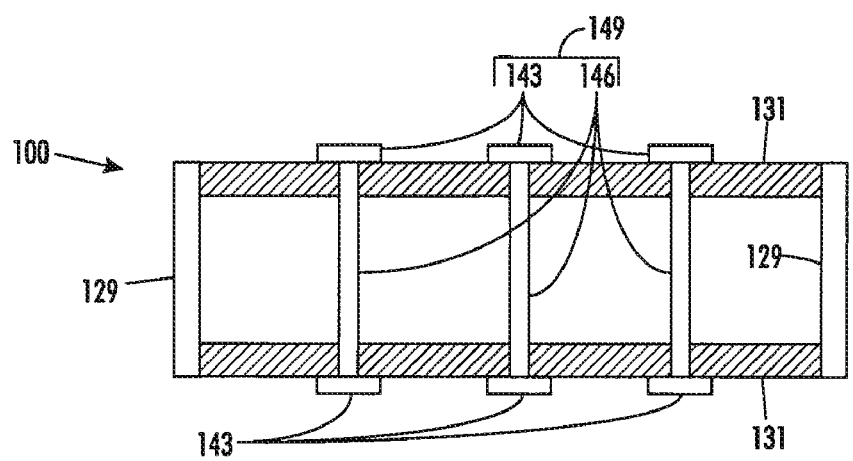
FIG. 5 shows another example of a plan view of the cradle of FIG. 1 without the quartz boats and the fusible parts, including the center support and two quarter supports to prevent bowing of the cradle, according to another embodiment of the present invention.

FIG. 5 shows another example of a plan view of the cradle of FIG. 1 without the quartz boats and the fusible parts, including the center support and two quarter supports to prevent bowing of the cradle, according to another embodiment of the present invention. While the center support 149 of FIGS. 3 and 4 may provide sufficient support to the quartz boats, in some cases, additional supports such as quarter supports 149 of FIG. 5 may be needed to provide additional stabilization to the cradle 100. In addition, quarts boats (e.g., 133 of FIG. 1) may be positioned or located between the center and quarter supports 149.

Figure 6A:
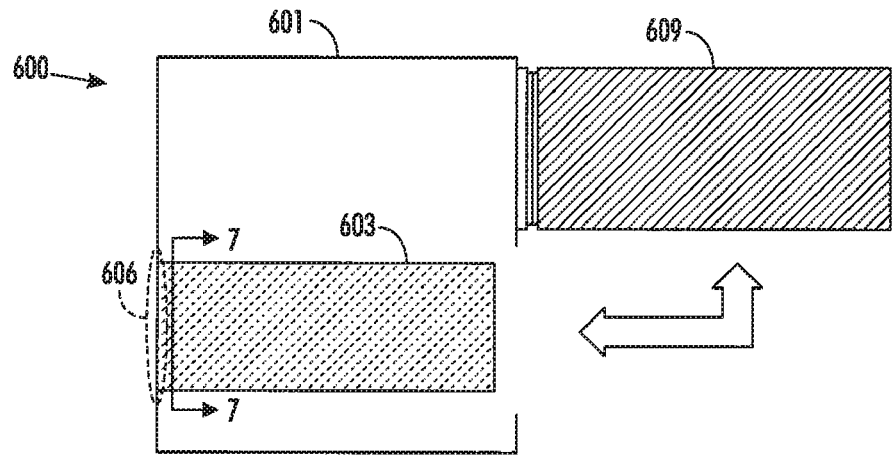
FIGS. 6A and 6B show an example of a diffusion furnace including an enclosure, a reaction chamber, a moveable furnace heating element, and a cradle including quartz boats and fusible parts as illustrated in FIG. 1, and a paddle for inserting the cradle into the reaction chamber.
Figure 6B:
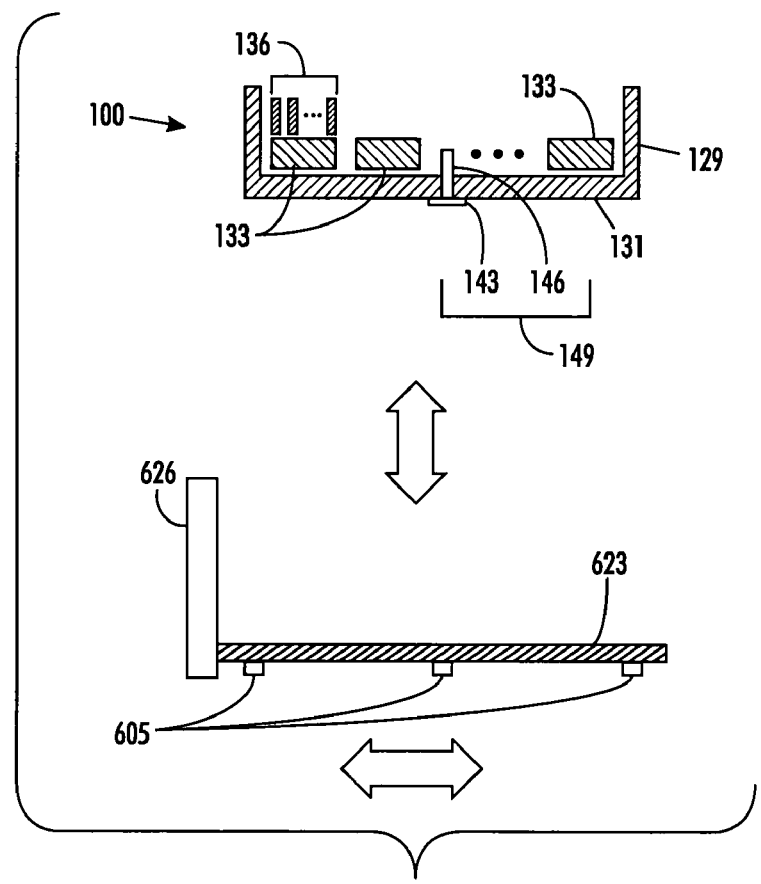

FIGS. 6A and 6B show an example of a diffusion furnace 600 including an enclosure 601, a reaction chamber 603, a moveable furnace heating element 609, and a cradle 100 including quartz boats 133 and fusible parts 136 as illustrated in FIG. 1, and a paddle 623 for inserting the cradle 100 into the reaction chamber 603. The following description proceeds with reference to FIGS. 6A and 6B.

Prior to brazing the jet stacks 136, the jet stacks 136 may be arranged in quartz boats and inserted into the reaction chamber 603 of the diffusion furnace 600. The reaction chamber 603 may be a quartz tube. As previously mentioned, the cradle 100 may be comprised of quartz and may be structured to hold at least one removeably attached quartz boat 133. The quartz boats 133 may have slots to hold the jet stacks 136. An operator, engineer, or other qualified technician trained to use the diffusion furnace 600 may remove or detach the quartz boats 133 off of the cradle 100 and take the quartz boats 133 to other locations of a clean room to fill the quartz boats 133 with the jet stacks 136. The operator may then return and arrange or attach the quartz boats 133 on the cradle 100 and then insert the cradle 100 into the reaction chamber 603 located in the enclosure 601 of the diffusion furnace 600 in preparation for the brazing process. The operator may insert the cradle 100 into the reaction chamber 603 using a cantilever or paddle 623 and may seal an interior of the reaction chamber 603 with end cap 626.

As explained above, prior to the brazing process, the jet stacks 136 may comprise individual plates that have previously been bonded together using a high pressure bond press (not shown). The diffusion furnace 600 may hold about 80 10" (inch) jet stacks or 160 4" (inch) jet stacks, and may form the jet stacks out of the individual plates according to the brazing recipe, as will be discussed in detail below.

The diffusion furnace 600 is structured so that various gasses may flow into and out of the reaction chamber 603. The reaction chamber 603 remains in a generally fixed location while the moveable furnace heating element 609 can move from a location spaced apart from the reaction chamber 603 to a location in substantial proximity to the reaction chamber 603. When the diffusion furnace 600 moves the furnace heating element 609 toward the reaction chamber 603, a temperature of an atmosphere within the reaction chamber 603 may rapidly increase. Conversely, when the diffusion furnace 600 moves the furnace heating element 609 away from the reaction chamber 603, the temperature of the atmosphere within the reaction chamber 603 may decrease.

Generally, the moveable furnace heating element 609 spends most of its time spaced apart from the reaction chamber 603 and typically moves toward the reaction chamber 603 only after the diffusion furnace 600 has adjusted the atmosphere of the interior of the reaction chamber 603 according to predefined conditions of the brazing recipe. The diffusion furnace 600 may preheat the moveable furnace heating element 609 while in the location that is spaced apart from the reaction chamber 603, and may substantially maintain the moveable furnace heating element 609 at the predefined temperature.

A programmable logic control unit (PLC) (not shown) may be used to control the gasses flowing into and out of the reaction chamber 603, to control the movement of the furnace heating element 609, to sense temperature and atmospheric conditions within the reaction chamber 603 using various sensors that provide feedback information, to trigger alarm conditions, to identify individual titles of segments of a brazing recipe, and to skip out of certain recipe segments responsive to the sensors or other feedback information, among other possibilities, according to the previously fine-tuned brazing recipe.

An operator may position the cradle 100 including the center support 149, the quartz boats 133 attached to the cradle 100, and the jet stacks 136 inserted into the quartz boats, on the paddle 623, which may then be inserted together with the temperature sensors 605 into the reaction chamber 603 of the diffusion furnace 600. The reaction chamber 603 may be sealed around a load zone 606 using the end cap 626.

Once located within the reaction chamber 603, the brazing recipe proceeds to cause a series of recipe segments and associated actions to be performed so that the jet stacks 136 are formed. For example, the moveable furnace heating element 609 may cause gold to flow when placed in proximity to the reaction chamber 603 so as to fuse the individual plates of the jet stacks 136 together so that internal structures are aligned with aperture holes. Additional details and actions performed as part of the brazing recipe are set forth in more detail below with reference to FIG. 10.

When the diffusion furnace 600 finishes applying the brazing recipe to the jet stacks 136, an operator may unseal the interior of the reaction chamber 603 and remove the cradle 100 including the quartz boats 133 and jet stacks 136 from the interior of the reaction chamber 603. Thus, the jet stacks 136 may be generated as a batch without the use of a continuous belt driven furnace.

Figure 7:
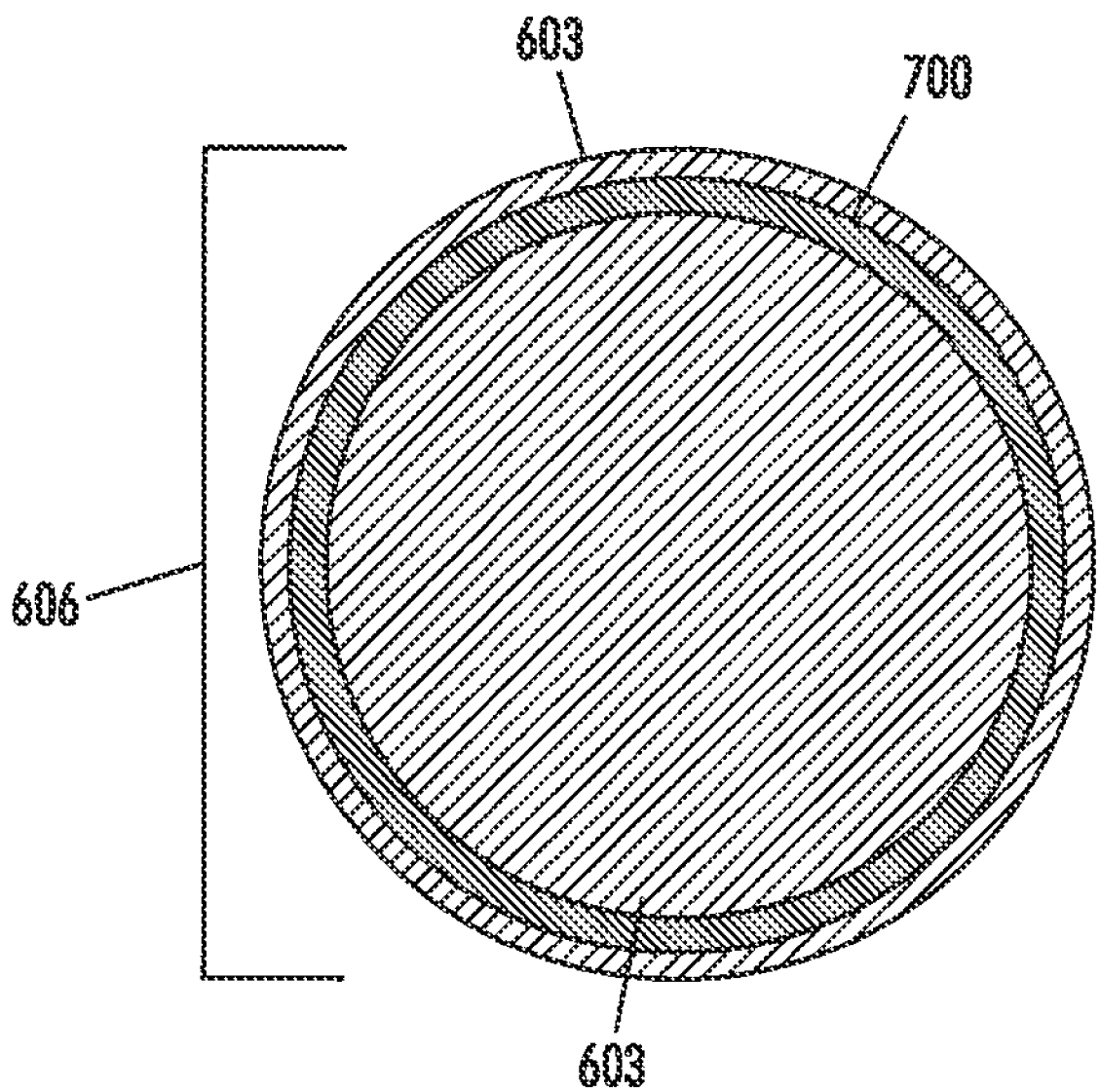
FIG. 7 shows a view of the reaction chamber of the diffusion furnace taken along lines 7-7 as illustrated in FIG. 6A, and includes a high temperature insulation band, according to yet another embodiment of the present invention.

FIG. 7 shows a view of the reaction chamber of the diffusion furnace taken along lines 7-7 as illustrated in FIG. 6A, and includes a high temperature insulation band 700, according to yet another embodiment of the present invention. The high temperature insulation band 700 may be located at an exterior of the reaction chamber 603 near the load zone 606. When the end cap 626 (of FIG. 6B) is used to seal the reaction chamber 603, the insulation band 700 ensures the temperature can be maintained, particularly around the load zone 606, during the processing of the brazing recipe. In particular, the insulation band 700 is held in place from outward radial pressure exerted by the insulation band 700 itself. In other words, no adhesive is required and damage to the reaction chamber 603 and the end cap 626 is prevented. The insulation band 700 may be a high temperature ceramic braided rope about one inch thick.

An operator can determine that the insulation band 700 around the load zone 606 of the reaction chamber 603 is improperly positioned based on a temperature measurement obtained by at least one temperature sensor (e.g., 605) located near the load zone 606. The presence of the insulation band 700 contributes to an increase in product quality and fewer rejects, particularly for those jet stacks located near the load zone 606.

Figure 8:
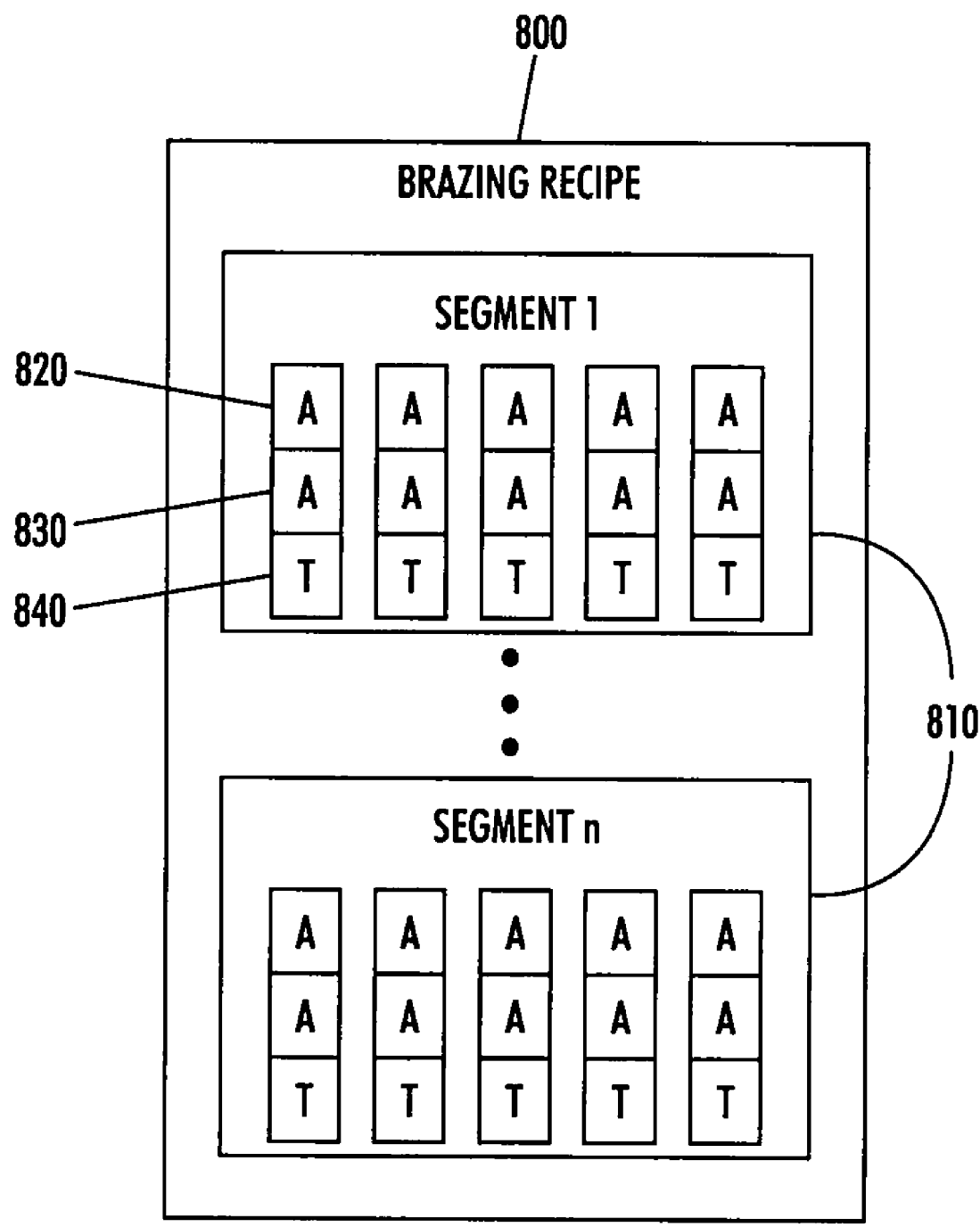
FIG. 8 shows an example of a brazing recipe, according to some embodiments of the present invention.

FIG. 8 shows an example of a brazing recipe, according to some embodiments of the present invention. As briefly discussed above, an engineer or other qualified technician may develop and fine-tune a brazing recipe 800 before the jet stacks can be batch brazed in the diffusion furnace 600 (of FIG. 6A).

The brazing recipe 800 comprises a sequence of recipe segments 810. Each of the recipe segments 810 may include actions 820. For example, actions 820 may include increasing a temperature of a reaction chamber of the diffusion furnace, purging a particular type of gas from the reaction chamber using a mass flow controller, filling the reaction chamber with a different gas using a mass flow controller, checking for moisture within the reaction chamber, and so forth. Each action 820 may be associated with an alarm 830 and a title 840 to give notice to an operator of any aborted action due to an error or fault within the recipe segment. The alarm 830 and the title 840 can inform the operator of the problem, such as where the action was aborted, so that the operator can call a shift supervisor or other maintenance personnel in order to correct the problem.

The alarm 830 may be triggered based on feedback information, such as information received from thermocouples, oxygen sensors, hygrometers (to measure water concentration in gas), furnace heating element position sensors, gas flow meters, among other possibilities. Segment titles may then be displayed to the operator responsive to the associated alarm. One possible result of the alarm may be that the diffusion furnace skips out of the segment of the recipe responsive to the alarm with the purpose of preserving the parts that are being brazed, or alternatively, to preserve the diffusion furnace equipment itself.

Figure 9:
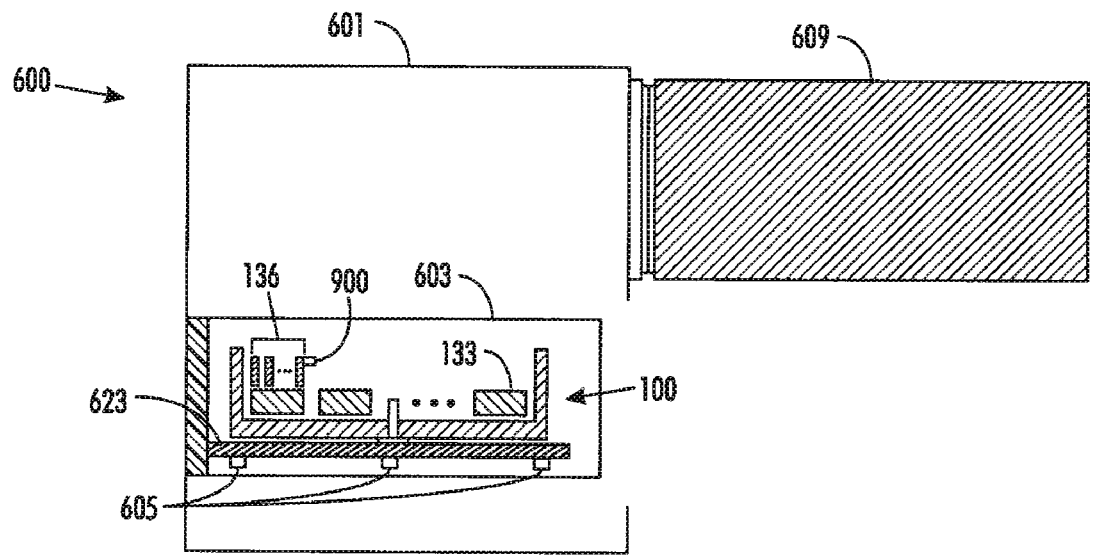
FIG. 9 shows an example of the cradle of FIG. 1 inserted into the reaction chamber of FIG. 6A, including temperature sensors attached to the fusible parts and to the paddle, and also including the moveable furnace heating element in a location spaced apart from the reaction chamber of the diffusion furnace.

FIG. 9 shows an example of the cradle of FIG. 1 inserted into the reaction chamber of FIG. 6A, including temperature sensors 900 attached to the fusible parts 136 and to the paddle 623, and also including the moveable furnace heating element 609 in a location spaced apart from the reaction chamber 603 of the diffusion furnace 600.

To fine-tune the brazing recipe 800 (of FIG. 8), the engineer or other qualified technician may place temperature sensors 900 on the jet stacks 136 themselves. While one temperature sensor 900 is illustrated in FIG. 9, other temperature sensors 900 may be attached to jet stacks 136. Preferably, one temperature sensor 900 may be attached to jet stacks 136 near the load zone, another temperature sensor 900 may be attached to jet stacks near the middle (not shown), and yet another temperature sensor 900 may be attached to jet stacks near an end opposite to the load zone (not shown). The jet stacks 136 are placed in quartz boats 133 and loaded on a cradle 100 for insertion into the reaction chamber 603 of the diffusion furnace 600 using the support of a cantilever or paddle 623.

The paddle also includes temperature sensors 605 attached to a bottom portion thereto, which are permanent in the sense that the temperature sensors 605 attached to the paddle 623 remain in place during production of the jet stacks, whereas the temperature sensors 900 attached on the jet stacks themselves serve only to fine-tune the brazing recipe 800 (of FIG. 8), and are removed once the brazing recipe is fine-tuned. The temperature sensors may be thermocouples, and may be distributed among several locations at the bottom portion of the paddle 623, and among the jet stacks 136 themselves such as toward the end and/or middle portions of the jet stacks that are inserted in the quartz boats 133.

Once the temperature sensors 900 are attached to the jet stacks 133 and the jet stacks are placed in the reaction chamber 603 of the diffusion furnace 600 using the support of the paddle 623, a temperature reading of the temperature sensors 900 on the jet stacks 133 themselves can be compared to a temperature reading of the permanent temperature sensors 605 attached to the bottom portion of the paddle 623. This comparison can be performed during different recipe segments 810 (of FIG. 8) or at different times within a segment while fine-tuning the brazing recipe 800 (of FIG. 8).

If a temperature reading of one or more of the sensors 900 attached to the jet stacks is lower than a temperature reading of one or more of the permanent sensors 605 attached to the bottom portion of the paddle 623, the engineer or other qualified technician may adjust a set point (e.g., action 820 of FIG. 8) for the permanent temperature sensors 605 to ensure the actual temperature of the jet stack 133 can be accurately controlled. When the engineer or other qualified technician completes the fine-tuning of the brazing recipe, the temperature sensors 900 attached to the jet stacks 133 can be removed and are not needed in subsequent batch brazing operations.

Figure 10:
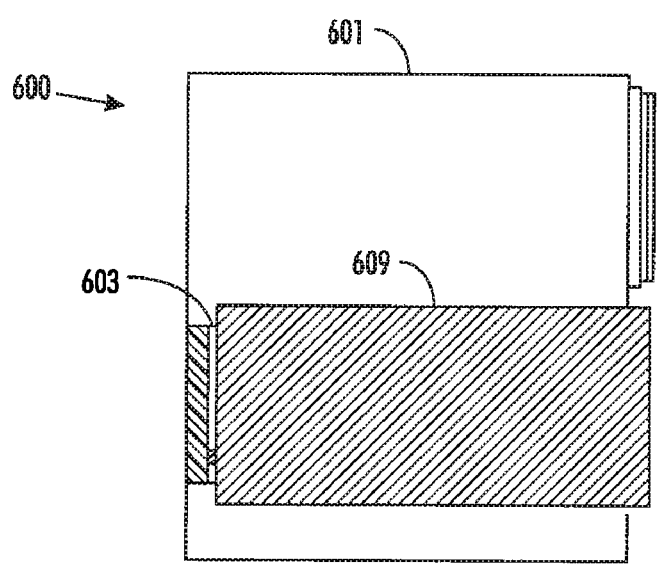
FIG. 10 shows an example of the moveable furnace heating element in a location substantially proximal to the reaction chamber of the diffusion furnace.

FIG. 10 shows an example of the moveable furnace heating element in a location substantially proximal to the reaction chamber of the diffusion furnace. As discussed throughout above, the diffusion furnace 600 may include a moveable furnace heating element 609 to rapidly increase or decrease a temperature of an atmosphere within the reaction chamber 603 according to the brazing recipe 800 (of FIG. 8). The movement of the furnace heating element 609 can occur while fine-tuning the brazing recipe 800 (of FIG. 8) as set forth above with reference to FIG. 9. Moreover, the movement of the furnace heating element 609 can occur while producing the jet stacks 136 at a production level according to the brazing recipe 800, i.e., after the fine-tuning of the brazing recipe 800 has been completed.

Figure 11:
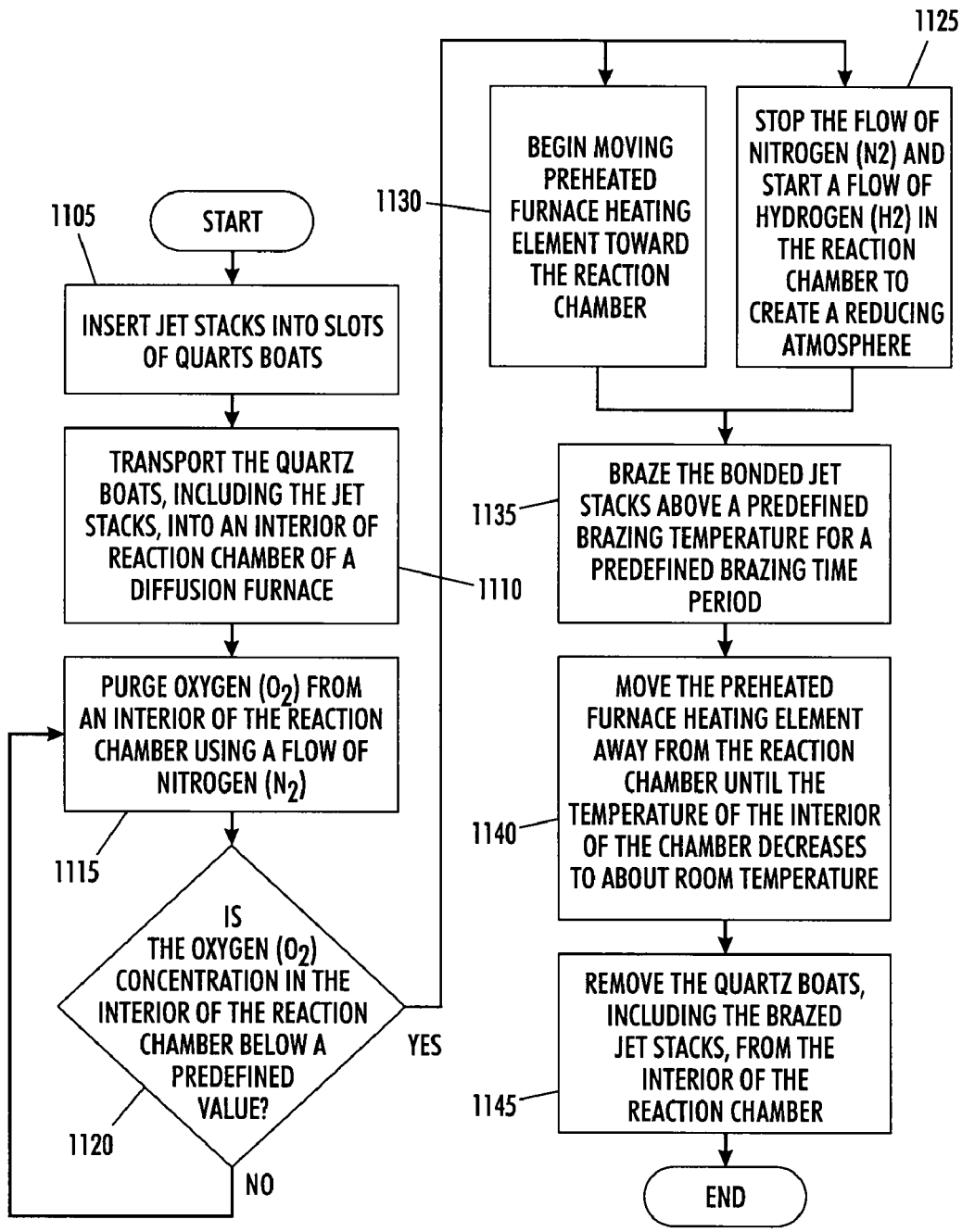
FIG. 11 shows a flow diagram illustrating the steps of jet stack batch brazing in the diffusion furnace, according to some embodiments of the present invention.

FIG. 11 shows a flow diagram illustrating the steps of jet stack brazing in the diffusion furnace, according to some embodiments of the present invention. After an engineer or qualified technician completes the fine-tuning of the brazing recipe as explained in detail with reference to FIGS. 8-10 above, the diffusion furnace may be placed into production to perform production level batch brazing operations. At 1105 of FIG. 11, an operator may insert jet stacks into slots of at least one quartz boat. The operator may then transport the quartz boats, including the jet stacks, into an interior of a reaction chamber of a diffusion furnace at 1110.

In some embodiments, the quartz boats may be attached or placed on a quartz cradle, which may then be loaded into the interior of the reaction chamber using a cantilever or paddle. The interior of the reaction chamber may be sealed using an end cap. After the reaction chamber has been sealed, the diffusion furnace may adjust an atmosphere of the interior of the reaction chamber according to a brazing recipe. For example, at 1115, the diffusion furnace may purge substantially all oxygen ($O_2$) from the interior of the reaction chamber using a flow of nitrogen ($N_2$) into the reaction chamber. The concentration of oxygen ($O_2$) in the interior of the reaction chamber may be measured during the purge. The preheated furnace heating element, which may initially be spaced apart from the reaction chamber, may be prevented from moving to a location in substantial proximity with the reaction chamber until the oxygen ($O_2$) concentration is below a predefined value, such as about 50 parts per million (ppm).

At 1120, if sensors within the diffusion furnace determine that the oxygen ($O_2$) concentration is below the predefined value, the diffusion furnace may begin to move the preheated furnace heating element toward the reaction chamber while simultaneously stopping the flow of nitrogen ($N_2$) and starting a flow of hydrogen ($H_2$) in the reaction chamber to create a reducing atmosphere, as shown at 1130 and 1125 of FIG. 11.

The diffusion furnace may complete moving the furnace heating element to the location in substantial proximity with the reaction chamber to increase the temperature of the interior of the reaction chamber above a predefined brazing temperature, such as about 1100 degrees Celsius, for a predefined brazing timer period, such as for about four minutes, according to the recipe as shown at 1125 and 1130 of FIG. 11. Pure gold begins to flow at about 1060 degrees Celsius. By controlling the timing of the temperature ramp rate of the interior of the reaction chamber, the temperature of the actual fusible parts within the reaction chamber can be controlled to ensure a low temperature delta across the batch.

The jet stacks may therefore be brazed under high temperature, atmospheric pressure conditions established within the reaction chamber of the diffusion furnace. Essentially, the brazing may include alloying individual plates of the jet stacks into a plurality of hermetically sealed brazed jet stacks. When the gold begins to flow, the stainless steel plates are brazed while the apertures within the jet stacks remain open for later ink squirting. In other words, the gold may flow around the apertures as the individual plates fuse together. At 1140, the diffusion furnace may move the furnace heating element from the location in substantial proximity with the reaction chamber to the location spaced apart from the reaction chamber to decrease the temperature of the atmosphere of the interior of the reaction chamber until the atmosphere cools to about room temperature.

The operator may then unseal the interior of the reaction chamber and remove the cradle including the quartz boats and brazed jet stacks from the interior of the reaction chamber at 1145.

Figure 12:
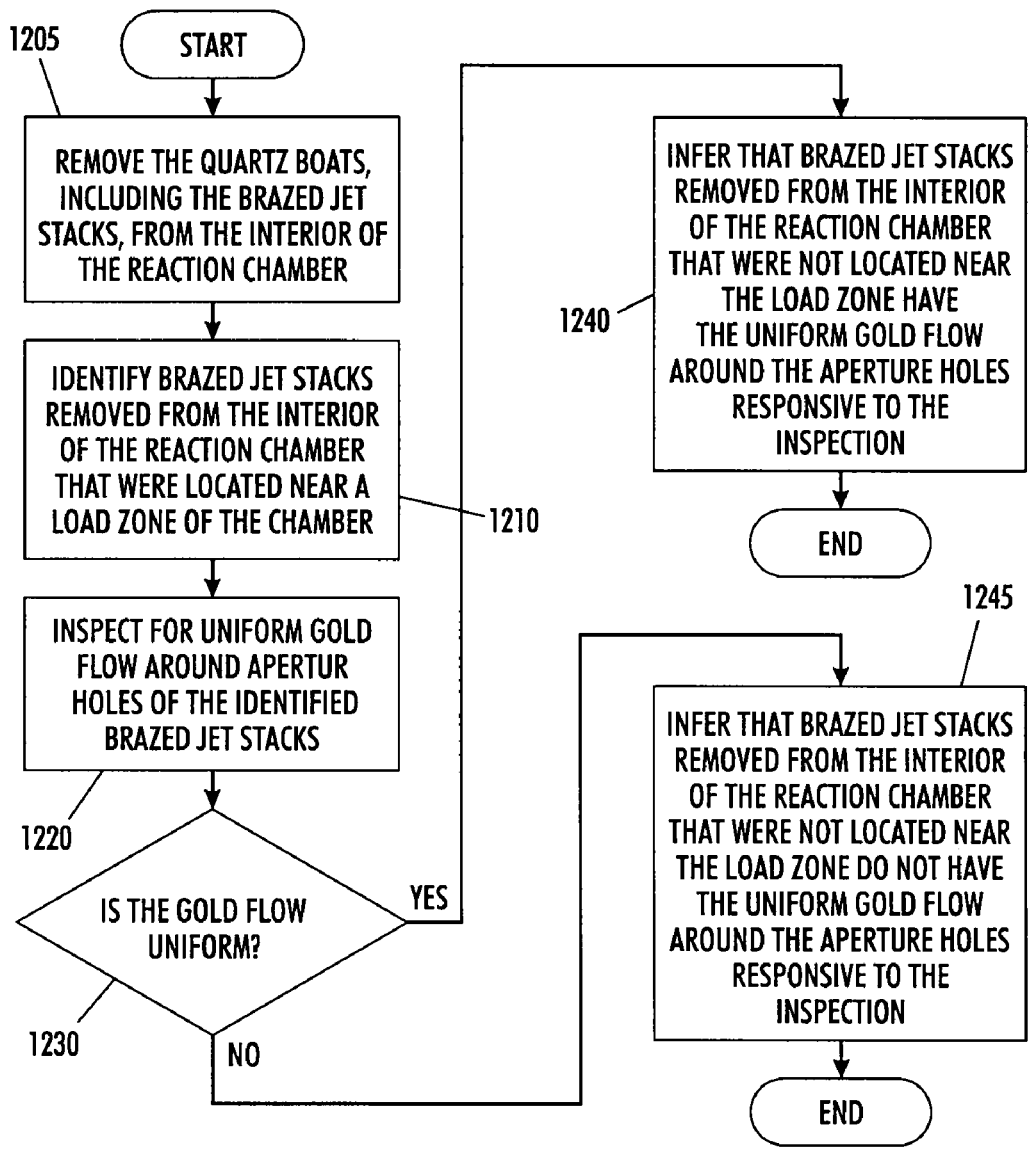
FIG. 12 shows a flow diagram illustrating the steps of inspecting the jet stacks after removal from the diffusion furnace, according to some embodiments of the present invention.

FIG. 12 shows a flow diagram illustrating the steps of inspecting the jet stacks after removal from the diffusion furnace, according to some embodiments of the present invention. At 1205, the operator may remove the quartz boats, including the brazed jet stacks, from the interior of the reaction chamber. At 1210, the operator may identify the brazed jet stacks removed from the interior of the reaction chamber that were located near a load zone of the reaction chamber. At 1220, the operator may inspect the jet stacks for uniform gold flow around aperture holes of the identified brazed jet stacks. At 1230, the operator can make a determination whether the gold flow is uniform around the aperture holes. This determination can be made according to a predefined inspection procedure according to predefined metrics. The operator can be aided in this determination through the use of a high powered scope or imaging device. Such an inspection by the operator lessens a possibility of reject parts downstream.

In addition, the operator can make an inference at 1240 that brazed jet stacks removed from the interior of the reaction chamber that were not located near the load zone have the uniform gold flow around the aperture holes if it is determined that the gold flow was uniform around the aperture holes of the jet stacks that were located near the load zone. Conversely, the operator can make an inference that brazed jet stacks removed from the interior of the reaction chamber that were not located near the load zone do not have the uniform gold flow around the aperture holes if it is determined that the gold flow was not uniform around the aperture holes of the jet stacks that were located near the load zone. In this manner, the time to inspect the gold flow can be reduced.

Figure 13:
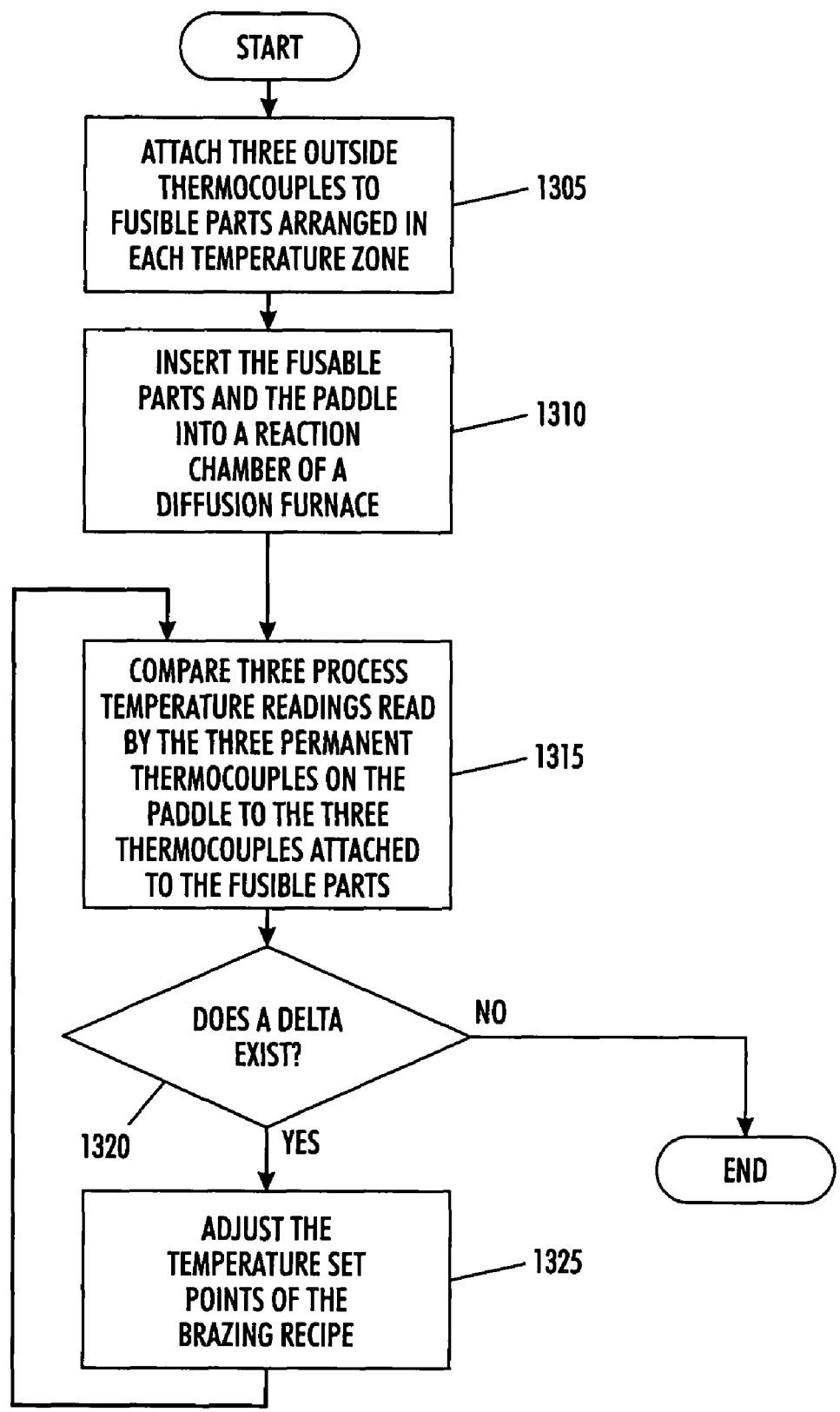
FIG. 13 shows a flow diagram illustrating the steps of tuning a brazing recipe responsive to temperature readings of the temperature sensors of FIG. 9.

FIG. 13 shows a flow diagram illustrating the steps of tuning a brazing recipe responsive to temperature readings of the temperature sensors of FIG. 9.

In order to fine-tune the brazing recipe (e.g., brazing recipe 800 of FIG. 8), an engineer or other qualified technician may attach three outside thermocouples to fusible parts arranged in each temperature zone (e.g., near the load zone, near the middle, and near the end opposite the load zone) at step 1305. The paddle may include attached thereto three permanent thermocouples. The engineer may then insert the fusible parts and the paddle into the reaction chamber of the diffusion furnace at 1310. During a segment of the brazing recipe, three process temperature readings read by the three permanent thermocouples on the paddle may be compared to the three outside thermocouples attached to the fusible parts at 1315. Should a delta exist at 1320, the temperature set points of the brazing recipe are adjusted accordingly at 1325 until the delta is minimized.

For example, should a delta exist between a first permanent thermocouple on the paddle and a first thermocouple attached to the fusible parts, or should a delta exist between a second permanent thermocouple on the paddle and a second thermocouple attached to the fusible parts, or should a delta exist between a third permanent thermocouple on the paddle and a third thermocouple attached to the fusible parts, or any combination of these, then the temperature set points of the brazing recipe may be adjusted up or down until the delta is reduced.

After adjustments are made at 1325, the process may continue to 1315 for additional comparisons. Once a delta no longer exists or has been sufficiently minimized at 1320, then the fine-tuning process can end. The temperature set points control the percentage power output for heaters of the diffusion furnace. This procedure ensures that the permanent thermocouples on the paddle are controlled based on the actual temperature of the fusible parts. Once the brazing recipe has been fine-tuned, the engineer or other qualified technician may remove the outside thermocouples from the fusible parts.

Figure 14:
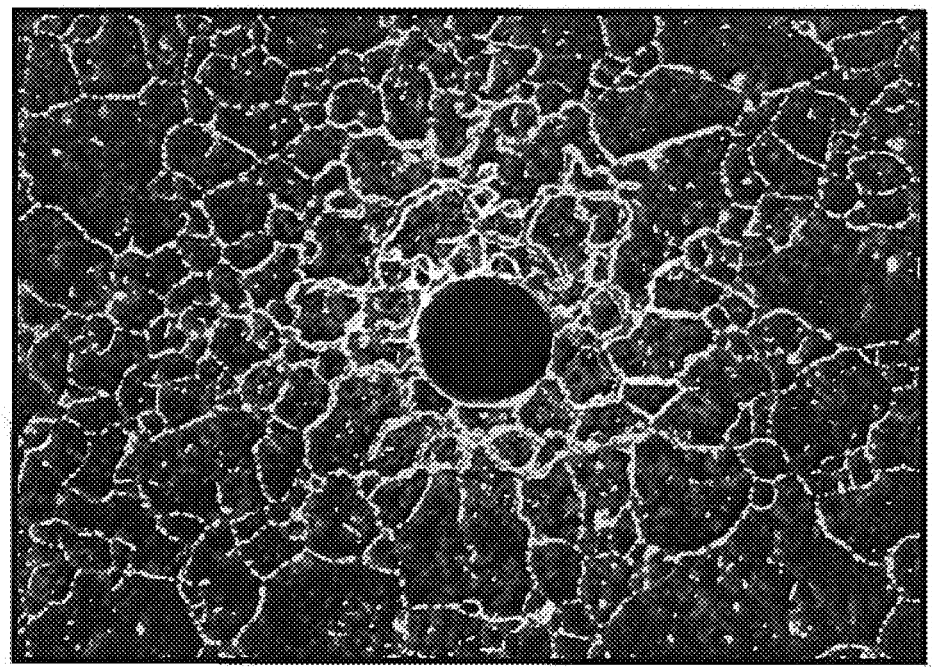
FIG. 14 shows an example acceptable gold flow around an aperture of a jet stack.

FIG. 14 shows an example acceptable gold flow around an aperture of a jet stack according to an embodiment of the present invention. As shown in FIG. 14, the gold flow shows a ring of gold around the aperture hole without any obstruction.

Figure 15:
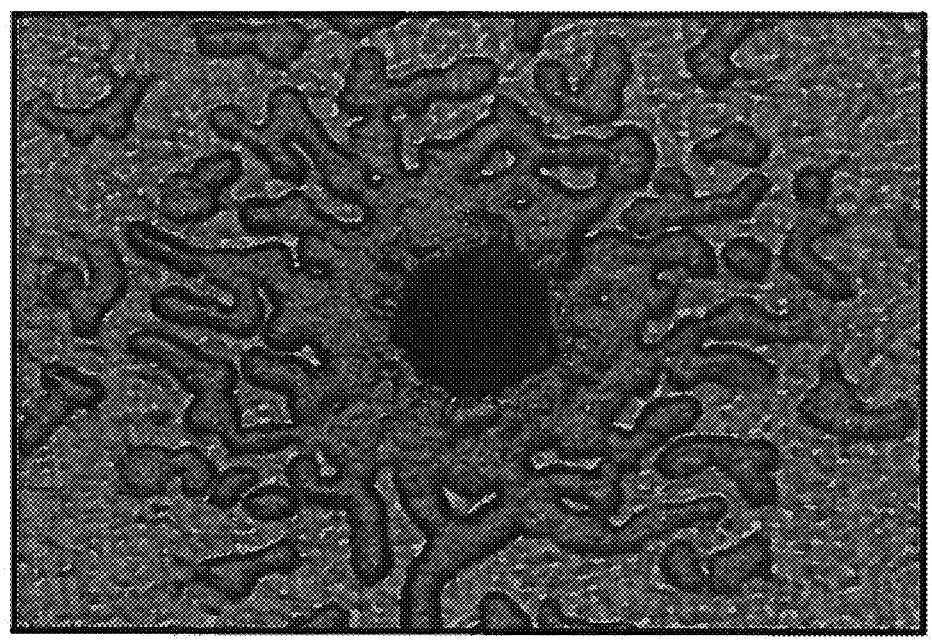
FIG. 15 shows an example of bad gold flow around an aperture of a jet stack.

FIG. 15 shows an example of bad gold flow around an aperture of a jet stack. As shown in FIG. 15, thick gold has accumulated around the aperture hole causing obstruction and the aperture to be misshaped.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus, comprising:
 a quartz boat having slots structured and arranged to hold jet stacks;
 each of the slots of the quartz boat having a marginal width relative to a width of a jet stack to control a flatness thereof; and
 an insulation band disposed between an end cap of a reaction chamber and an inner portion of a load zone of the reaction chamber, wherein the insulation band is structured to exert outward radial pressure to hold the insulation band in place without causing damage to the reaction chamber or the end cap,
 wherein the quartz boat is removeably attached to a cradle insertable to the reaction chamber to braze the jet stacks.

2. The apparatus of claim 1, wherein the insulation band comprises high temperature rope.

3. The apparatus of claim 1, further comprising:
 a moveable furnace heating element structured to preheat in a location spaced apart from the reaction chamber and to move toward the reaction chamber to braze the jet stacks,
 wherein the moveable furnace heating element is structured to be moved from the location spaced apart from the reaction chamber to a location in substantial proximity with the reaction chamber to increase a temperature of an atmosphere of the interior of the reaction chamber above a predefined brazing temperature for a predefined brazing time period.

4. The apparatus of claim 1, wherein each of the slots of the quartz boat has a predefined width corresponding to a width of the jet stack and the marginal width.

5. The apparatus of claim 4, wherein the marginal width is about 0.015 inches.

6. The apparatus of claim 4, wherein the marginal width is about 0.02 inches.

7. An apparatus, comprising:
 a quartz boat having slots structured and arranged to hold jet stacks;
 each of the slots of the quartz boat having a marginal width relative to a width of a jet stack to control a flatness thereof;
 wherein the quartz boat is removeably attached to a cradle insertable to a reaction chamber to braze the jet stacks;
 wherein the cradle comprises quartz and includes:
  horizontal portions arranged in parallel and spaced apart one from another; and
  a center support spanning a width between the horizontal portions to evenly distribute weight of the jet stacks to prevent bowing of the cradle; and
 an insulation band disposed between an end cap of the reaction chamber and an inner portion of a load zone of the reaction chamber, wherein the insulation band is structured to exert outward radial pressure to hold the insulation band in place without causing damage to the reaction chamber or the end cap.

8. The apparatus of claim 7, further comprising:
 a moveable furnace heating element structured to preheat in a location spaced apart from the reaction chamber and to move toward the reaction chamber to braze the jet stacks,
 wherein the moveable furnace heating element is structured to be moved from the location spaced apart from the reaction chamber to a location in substantial proximity with the reaction chamber to increase a temperature of an atmosphere of the interior of the reaction chamber above a predefined brazing temperature for a predefined brazing time period.

9. The apparatus of claim 7, wherein each of the slots of the quartz boat has a predefined width corresponding to a width of the jet stack and the marginal width.

10. The apparatus of claim 9, wherein the marginal width is about 0.015 inches.

11. The apparatus of claim 9, wherein the marginal width is about 0.02 inches.

12. The apparatus of claim 7, further comprising:
 a first quarter support disposed centrally between the center support and one end of the cradle, the first quarter support spanning the width between the horizontal portions; and
 a second quarter support disposed centrally between the center support and the other end of the cradle, the second quarter support spanning the width between the horizontal portions.

13. The apparatus of claim 7, wherein the quartz boat attaches to and is supported by the horizontal portions of the cradle.

14. The apparatus of claim 13, further comprising:
 a plurality of quartz boats disposed between the center and quarter supports.

15. The apparatus of claim 7, wherein the insulation band comprises high temperature rope.

* * * * *